US012434774B2

(12) United States Patent
Kang et al.

(10) Patent No.: US 12,434,774 B2
(45) Date of Patent: Oct. 7, 2025

(54) VEHICLE STRUCTURE

(71) Applicants: HYUNDAI MOTOR COMPANY, Seoul (KR); KIA CORPORATION, Seoul (KR)

(72) Inventors: Seung Min Kang, Hwaseong-si (KR); Joo Nam Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 373 days.

(21) Appl. No.: 18/136,152

(22) Filed: Apr. 18, 2023

(65) Prior Publication Data

US 2024/0199122 A1   Jun. 20, 2024

(30) Foreign Application Priority Data

Dec. 19, 2022  (KR) .................. 10-2022-0178374

(51) Int. Cl.
*B62D 27/02* (2006.01)
*B62D 21/03* (2006.01)
*B62D 25/02* (2006.01)
*B62D 25/04* (2006.01)
*B62D 25/08* (2006.01)
*B62D 25/20* (2006.01)

(52) U.S. Cl.
CPC ......... *B62D 25/2009* (2013.01); *B62D 21/03* (2013.01); *B62D 25/025* (2013.01); *B62D 25/04* (2013.01); *B62D 25/2036* (2013.01); *B62D 27/023* (2013.01)

(58) Field of Classification Search
CPC ...... B62D 25/025; B62D 25/04; B62D 25/08; B62D 25/2036; B62D 25/20; B62D 21/02; B62D 21/03; B62D 27/02; B62D 27/023; B62D 27/065
USPC ................... 296/29, 193.06, 2, 7, 9, 204
See application file for complete search history.

(56) References Cited

U.S. PATENT DOCUMENTS

| 4,988,230 A | * | 1/1991 | Banthia | .............. A47B 47/0008 403/231 |
| 5,947,519 A | * | 9/1999 | Aloe | ...................... B62D 21/07 403/402 |

(Continued)

FOREIGN PATENT DOCUMENTS

| JP | H08282532 A | 10/1996 |
| JP | 2022143368 A | 10/2022 |

(Continued)

OTHER PUBLICATIONS

KR20150019047 Text (Year: 2015).*

*Primary Examiner* — Dennis H Pedder
(74) *Attorney, Agent, or Firm* — Lempia Summerfield Katz LLC

(57) ABSTRACT

A vehicle structure includes a joint member having an upper side coupled to an A-pillar lower portion. The joint member has a rear coupled to a side sill and has a side coupled to a body front cross member. The A-pillar lower portion has a closed cross-section structure and has a lower end in surface contact with and coupled to the joint member. The side sill has a closed cross-section structure and has a front end in surface contact with and coupled to the joint member. The body front cross member has a closed cross-section structure and has a side end in surface contact with and coupled to the joint member.

19 Claims, 12 Drawing Sheets

(56) References Cited

U.S. PATENT DOCUMENTS

| | | | | |
|---|---|---|---|---|
| 6,010,182 | A * | 1/2000 | Townsend | B64C 1/08 296/29 |
| 6,665,935 | B2 * | 12/2003 | Panoz | B62D 23/00 29/466 |
| 10,286,961 | B2 * | 5/2019 | Hillebrecht | B22F 10/25 |
| 10,745,055 | B2 * | 8/2020 | Pastrick | B62D 21/04 |
| 10,766,543 | B2 * | 9/2020 | Cha | B62D 21/02 |
| 10,960,468 | B2 * | 3/2021 | Czinger | B62D 23/005 |
| 10,960,929 | B2 * | 3/2021 | Czinger | B62D 21/17 |
| 11,479,306 | B2 * | 10/2022 | Hasenauer | B29C 66/52441 |
| 2012/0175899 | A1 | 7/2012 | Gadhiya et al. | |
| 2017/0305253 | A1 | 10/2017 | Perlo et al. | |
| 2021/0179184 | A1 | 6/2021 | Ohnaka et al. | |
| 2022/0009330 | A1 | 1/2022 | Woo et al. | |

FOREIGN PATENT DOCUMENTS

| | | | | |
|---|---|---|---|---|
| KR | 20150019047 A | * | 2/2015 | B62D 25/20 |
| KR | 20210037904 A | | 4/2021 | |
| KR | 20220136715 A | | 10/2022 | |

\* cited by examiner

VEHICLE STRUCTURE

CROSS REFERENCE TO RELATED APPLICATION

The present application claims priority to Korean Patent Application No. 10-2022-0178374, filed Dec. 19, 2022, the entire contents of which are incorporated herein for all purposes by this reference.

BACKGROUND OF THE DISCLOSURE

Technical Field

The present disclosure relates to a technology about a structure of a vehicle.

Description of the Related Art

A vehicle provided with a frame has a configuration in which a body is coupled to an upper side of the frame. A coupling portion between the frame and the body is a main portion that requires sufficient rigidity.

The coupling between the frame and the body on a front side of the vehicle is mainly performed near a portion where a side sill and a lower portion of an A-pillar of the body are in contact with each other.

The foregoing is intended merely to aid in understanding the background of the present disclosure. The foregoing is not intended to mean that the present disclosure falls within the purview of the related art that is already known to those of ordinary skill in the art.

SUMMARY OF THE DISCLOSURE

Accordingly, an objective of the present disclosure is to provide a vehicle structure having a simple configuration without using welding. The vehicle structure is configured such that an A-pillar lower portion, a side sill, and a body front cross member that form a framework of a body are connected to each other and form a solid coupling state with a frame positioned at a lower side of the structure. Thus, rigidity and durability of a vehicle are sufficiently secured. The vehicle structure is configured such that the body front cross member and a frame cross member form a closed loop shape so that rigidity of a front portion of the vehicle is further improved.

In order to achieve the above objective, according to the present disclosure, a vehicle structure is provided. The vehicle structure includes: a joint member having an upper side, a rear, and a side; an A-pillar lower portion having a closed cross-section structure and having a lower end in surface contact with and coupled to the upper side of the joint member; a side sill having a closed cross-section structure and having a front end in surface contact with and coupled to the rear of the joint member; and a body front cross member having a closed cross-section structure and having a side end in surface contact with and coupled to the side of the joint member.

The lower end of the A-pillar lower portion, the front end of the side sill, and the side end of the body front cross member may be paired with the joint member 7. In other words, the lower end of the A-pillar lower portion, the front end of the side sill, and the side end of the body front cross member may be coupled to an outer side of the joint member with two or three surfaces thereof in surface contact with adjacent surfaces of the joint member and may be coupled to an inner side of the joint member with two or three surfaces thereof in surface contact with adjacent surfaces of the joint member.

In the lower end of the A-pillar lower portion, a front portion and an outer side portion may be in surface contact with the outer side of the joint member, and a rear portion and an inner side portion may be in surface contact with the inner side of the joint member.

The A-pillar lower portion may be provided with a pillar rear rib that protrudes rearward along a longitudinal direction of the A-pillar lower portion. The joint member may be provided with a joint upper rib that is aligned with the pillar rear rib of the A-pillar lower portion.

In the side sill, an outer side portion, an upper side part, and a lower side part of the front end of the side sill may be in surface contact with the outer side of the joint member. Also, an inner side portion, an upper side part, and a lower side part of the front end of the side sill may be in surface contact with the inner side of the joint member.

The side sill may be provided with a sill upper rib and a sill lower rib that respectively protrude upward and downward along a longitudinal direction of the side sill. An upper side portion of the front end of the side sill may be divided into an outer side portion and an inner side portion of the sill upper rib. The outer side portion of the sill upper rib may be in surface contact with the outer side of the joint member and the inner side portion of the sill upper rib may be in surface contact with the inner side of the joint member. Furthermore, a lower side portion of the front end of the side sill may be divided into an outer side portion and an inner side portion of the sill lower rib. The outer side portion of the sill lower rib may be in surface contact with the outer side of the joint member and the inner side portion of the sill lower rib may be in surface contact with the inner side of the joint member.

A joint upper rib, which protrudes in front and rear directions and which is formed in a planar shape, may be provided on the upper side of the joint member. The sill upper rib may be disposed such that the sill upper rib is aligned on the same plane with the joint upper rib in the front and rear directions.

An upper offset portion, which has an offset modified toward a first side of the sill upper rib so as to be in surface contact with the sill upper rib, may be provided on a rear of the joint upper rib.

A joint lower rib, which protrudes in front and rear directions and which is formed in a planar shape, may be provided on a lower side of the joint member. The sill lower rib may be disposed such that the sill lower rib is aligned on the same plane with the joint lower rib in the front and rear directions.

A joint lower rib, which protrudes in front and rear directions and which is formed in a planar shape, may be provided on a lower side of the joint member. The sill lower rib may be disposed such that the sill lower rib is aligned on the same plane with the joint lower rib in the front and rear directions.

In the body front cross member, an upper side portion and a rear portion of the side end of the body front cross member may be in surface contact with the outer side of the joint member. Also, a lower side portion and a front portion of the side end of the body front cross member may be in surface contact with the inner side of the joint member.

A joint side rib that protrudes downward from the joint member may be provided on a lower side of a portion of the joint member. The portion of the joint member may be in surface contact with a lower side of the body front cross member.

The joint side rib may be formed in a planar shape parallel to a longitudinal direction of the body front cross member. A lower end of the joint side rib may be connected to a mounting portion surrounding wall formed so as to surround a frame mounting portion.

A frame mounting portion for coupling a frame may be integrally formed on a lower side of the joint member. Hardware for coupling the frame may be mechanically mounted on the frame mounting portion.

The hardware may be formed of a bolt that protrudes downward from the frame mounting portion or may be formed of a nut that is provided on the frame mounting portion such that the nut is coupled to a bolt inserted into the nut from a lower side of the nut.

The frame mounting portion may include: a cylindrical portion open toward the lower side of the joint member; a mounting portion surrounding wall formed so as to surround a periphery of the cylindrical portion; and a plurality of mounting portion reinforcing ribs formed between the cylindrical portion and the mounting portion surrounding wall.

The frame coupled to the frame mounting portion may have a frame front cross member that is provided on a front side of a vehicle so as to connect between frame side members positioned at opposite sides of the frame. The frame front cross member, the frame side members, and the body front cross member may form a closed loop shape.

A seat mount may be coupled to an upper side of the body front cross member.

In a rear of the body front cross member, a body middle cross member may be further provided between each side sill respectively positioned at opposite sides of a vehicle. A front of the seat mount may be coupled to the upper side of the body front cross member and a rear of the seat mount may be coupled to an upper side of the body middle cross member.

The joint member may be formed of light metal, the A-pillar lower portion, the side sill, and the body front cross member may be formed of a steel material. Portions where the A-pillar lower portion, the side sill, and the body front cross member are in surface contact with the joint member may be coupled by a mechanical fastening member.

In the present disclosure, a simple configuration without using welding is provided. Also, the A-pillar lower portion, the side sill, and the body front cross member that form the framework of the body are connected to each other and form the solid coupling state with the frame positioned at the lower side of a vehicle. Thus, rigidity and durability of the vehicle are sufficiently secured, and the body front cross member and the frame cross member form the closed loop shape so that rigidity of the front portion of the vehicle is further improved.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION OF THE DISCLOSURE

Figure 1:
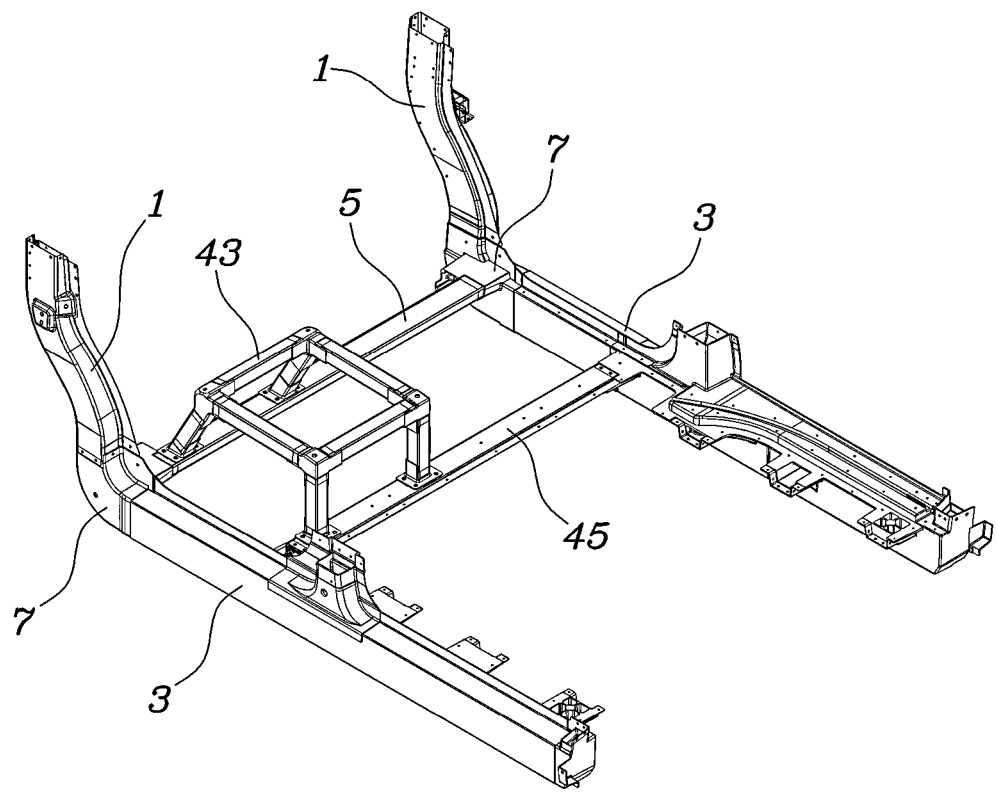
FIG. 1 is a view illustrating a vehicle structure according to the present disclosure.

Hereinafter, embodiments disclosed in the present specification are described in detail with reference to the accompanying drawings. In the present specification, the same or similar components are denoted by the same or similar reference numerals, and a repeated description thereof has been omitted.

In the following description, the expressions "module" and "portion" contained in terms of constituent elements to be described are selected or used together in consideration only for the convenience of writing the following specification. The expressions "module" and "portion" do not necessarily have different meanings or roles.

A detailed description of known technologies has been omitted where it is determined that the detailed description of the known technologies obscures the embodiments of the disclosure. In addition, the accompanying drawings are merely intended to describe the embodiments of the disclosure, but the spirit and technical scope of the present disclosure is not limited by the accompanying drawings. It should be understood that the present disclosure is not limited to specific disclosed embodiments, but includes all modifications, equivalents, and substitutes included within the spirit and technical scope of the present disclosure.

Terms including ordinals such as "first" or "second" used herein may be used to describe various elements, but the elements are not limited by the terms. The terms are only used for the purpose of distinguishing one element from another element.

When a component is referred to as being "connected" to or "contacted" by another component, it should be understood that it may be directly connected to or contacted by the other component, but other components may exist therebetween. On the other hand, when a component is referred to as being "directly connected" to or "directly contacted" by another component, it should be understood that there is no other component therebetween.

Singular expressions include plural expressions unless the context clearly indicates otherwise. When a component, device, element, module, portion, or the like of the present disclosure is described as having a purpose or performing an operation, function, or the like, the component, device, element, module, or portion should be considered herein as being "configured to" meet that purpose or to perform that operation or function.

It is to be understood that terms such as "including", "having", etc. are intended to indicate the existence of the features, numbers, steps, actions, elements, components, or combinations thereof disclosed in the specification. Such terms are not intended to preclude the possibility that one or more other features, numbers, steps, actions, elements, components, or combinations thereof may exist or may be added.

Referring to FIGS. 1-12, an embodiment of a vehicle structure of the present disclosure includes a joint member 7 having an upper side coupled to an A-pillar lower portion 1. The joint member 7 has a rear thereof coupled to a side sill 3 and the joint member 7 has a side thereof coupled to a body front cross member 5. The A-pillar lower portion 1 has a closed cross-section structure and has a lower end in surface contact with and coupled to the joint member 7. The side sill 3 has a closed cross-section structure and has a front end in surface contact with and coupled to the joint member 7. The body front cross member 5 has a closed cross-section structure and has a side end in surface contact with and coupled to the joint member 7.

In addition, a frame mounting portion 11 for coupling a frame 9 is integrally formed on a lower side of the joint member 7. Hardware for coupling the frame 9 is mechanically mounted on the frame mounting portion 11.

In other words, with the joint member 7 as a center, the A-pillar lower portion 1 is coupled to the upper side of the joint member 7, the side sill 3 is coupled to a rear side of the joint member 7, the body front cross member 5 is coupled to an inner side of the joint member 7, and the frame 9 is coupled to the lower side of the joint member 7 through the frame mounting portion 11.

In addition, as described above, the A-pillar lower portion 1, the side sill 3, and the body front cross member 5 are coupled to the joint member 7 by a mechanical fastening member rather than welding. Also, three or more surfaces of end portions of each of the A-pillar lower portion 1, the side sill 3, and the body front cross member 5 are in surface contact with the joint member 7. Therefore, rigidity and durability of each coupling portion are sufficiently secured, and other additional components for securing rigidity are not required. Thus, the weight of a vehicle is capable of being reduced and also a sufficient body rigidity is capable of being secured.

The lower end of the A-pillar lower portion 1, the front end of the side sill 3, and the side end of the body front cross member 5 are paired with the joint member 7. More specifically, the lower end of the A-pillar lower portion 1, the front end of the side sill 3, and the side end of the body front cross member are coupled to an outer side of the joint member 7 with two or three surfaces thereof in surface contact with the joint member 7 and are coupled to the inner side of the joint member 7 with two or three surfaces thereof in surface contact with the joint member 7.

For reference, portions where the lower end of the A-pillar lower portion 1, the front end of the side sill 3, and the side end of the body front cross member 5 are in surface contact with the outer side and the inner side of the joint member 7 are indicated by a closed curve formed of a dotted line in the drawings.

Figure 2:
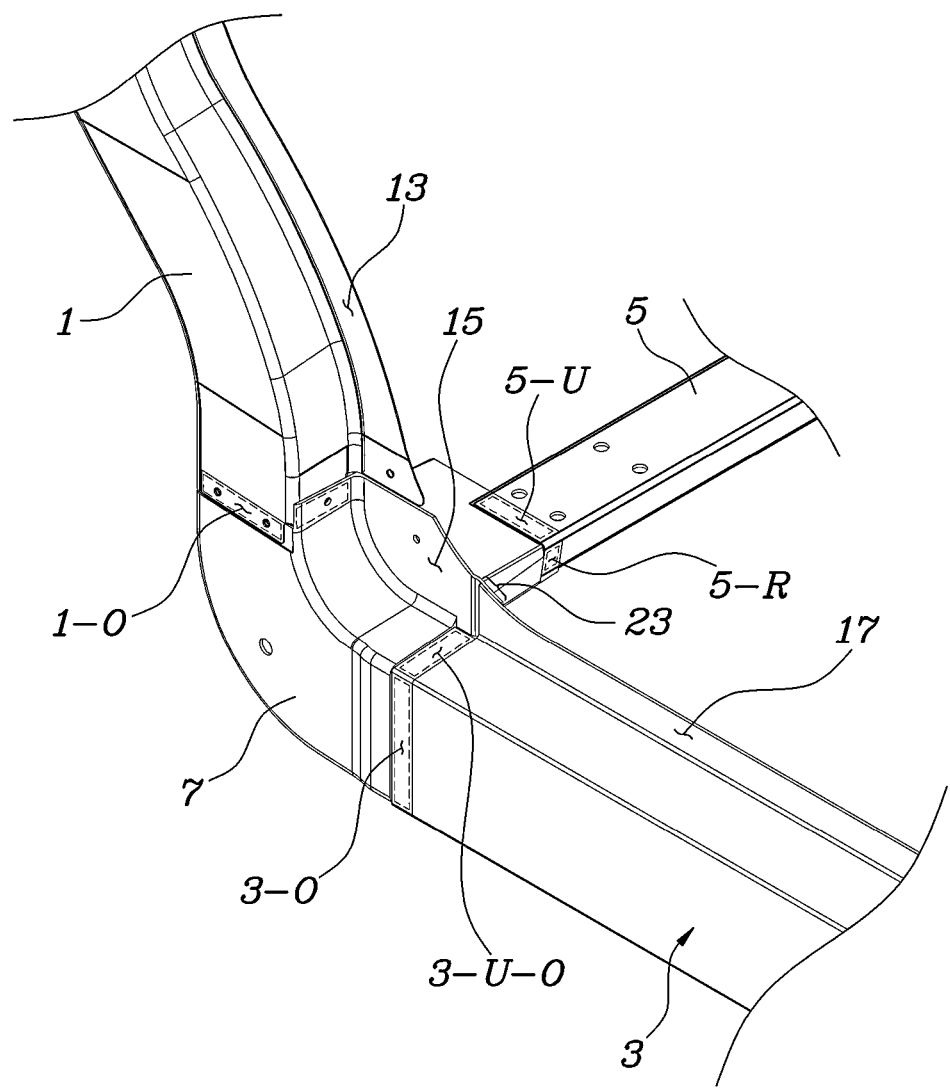
FIG. 2 is a detailed view illustrating main portions of the vehicle structure in FIG. 1.
Figure 3:
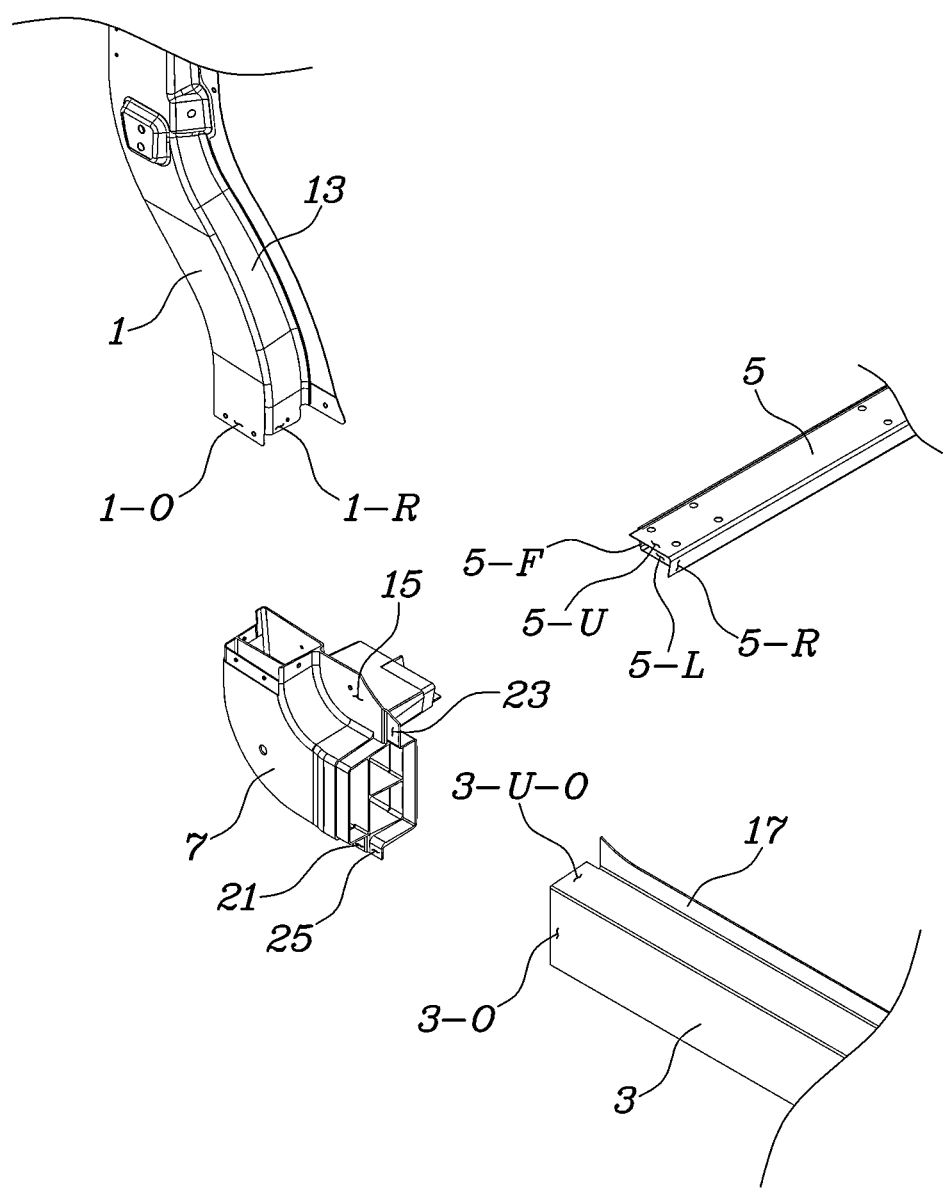
FIG. 3 is an exploded view illustrating the components in FIG. 2.
Figure 4:
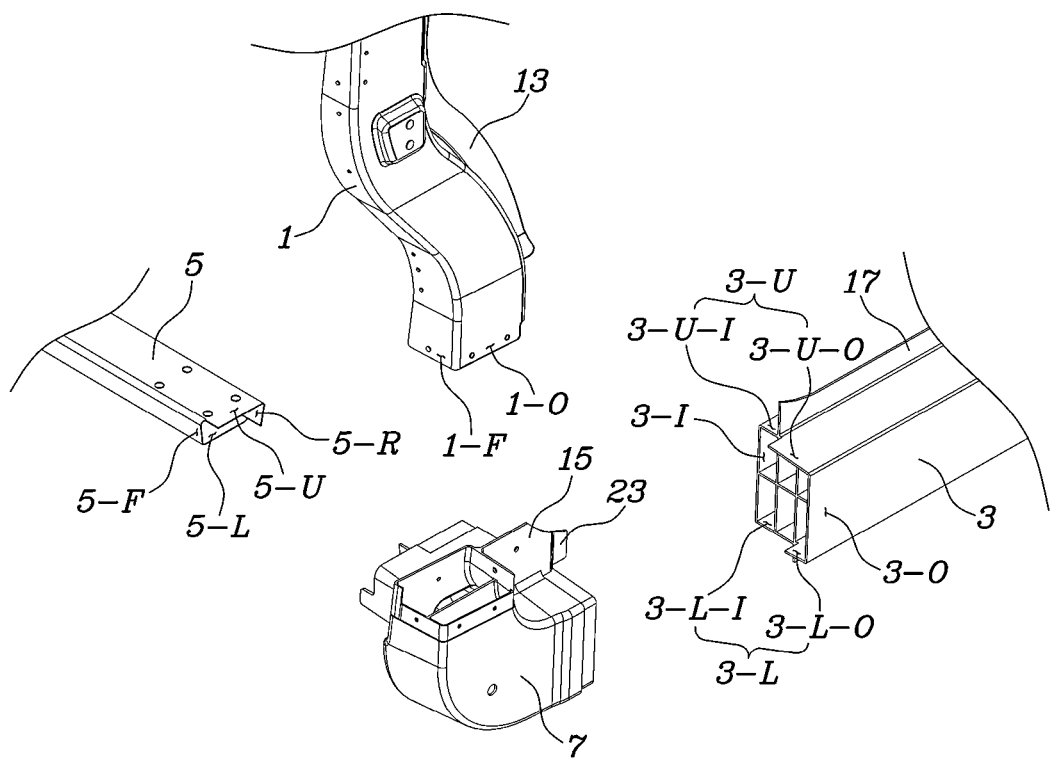
FIGS. 4-6 are views illustrating the components of FIG. 3 observed from different viewpoints.
Figure 5:
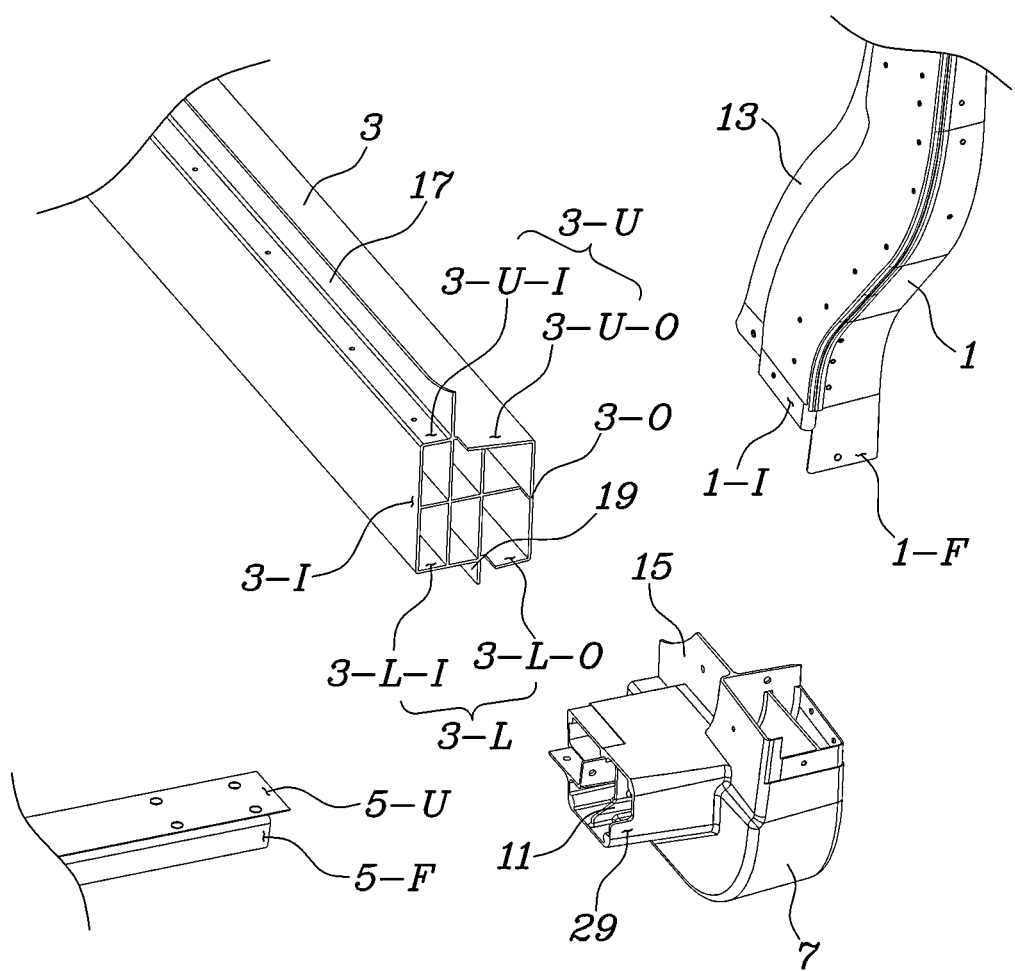
Figure 6:
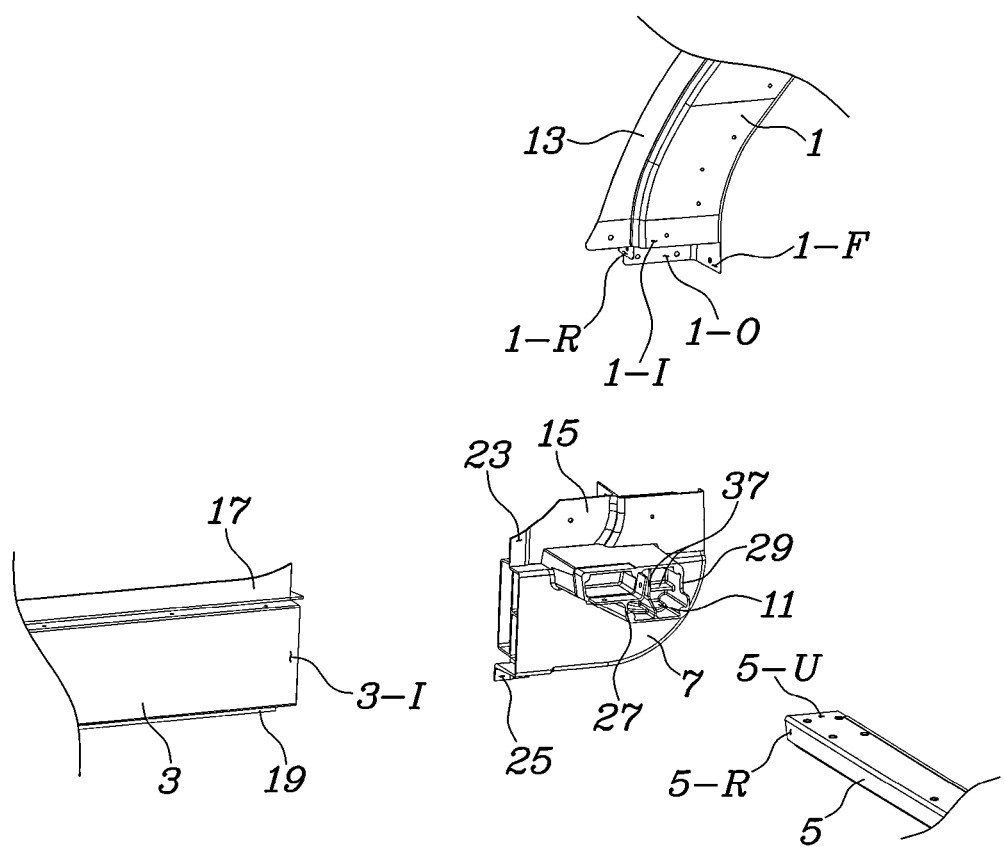
Figure 7:
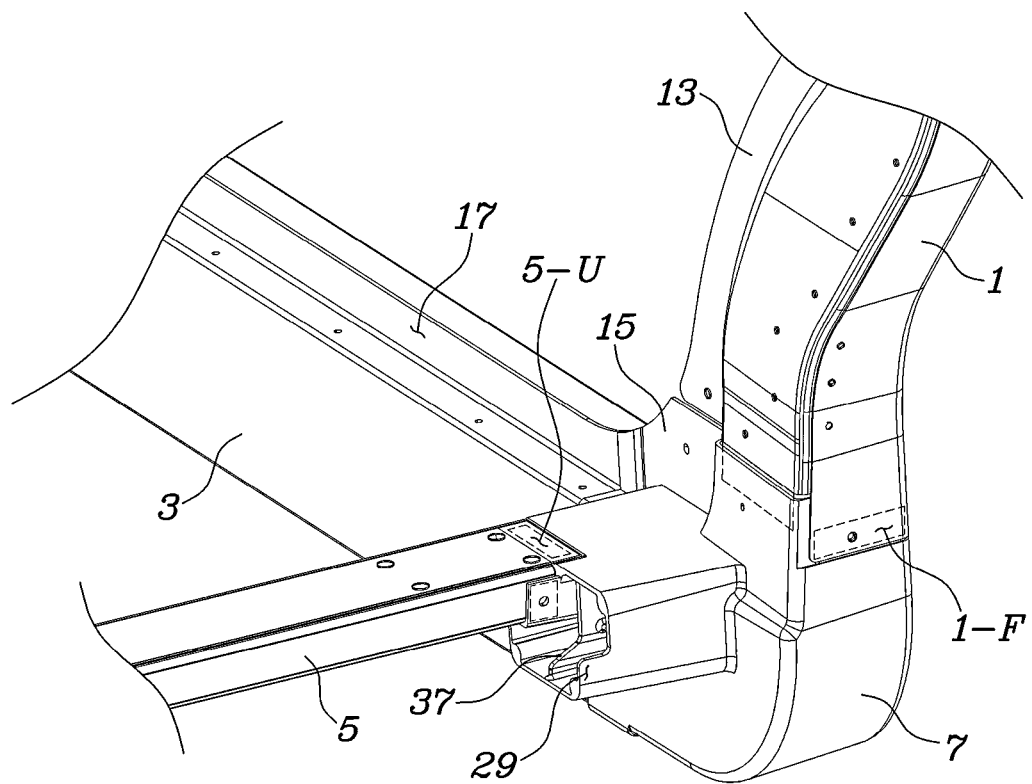
FIG. 7 is a view illustrating the components in FIG. 2 observed from a front inner side of a vehicle.

In other words, referring to FIG. 2 and FIG. 7, in the lower end of the A-pillar lower portion 1, a front portion 1-F and an outer side portion 1-O are in surface contact with the outer side of the joint member 7. Further, a rear portion 1-R and an inner side portion 1-I are in surface contact with the inner side of the joint member 7.

In other words, the front portion 1-F and the outer side portion 1-O of the lower end of the A-pillar lower portion 1 are paired with and are in surface contact with the outer side of the joint member 7. Likewise, the rear portion 1-R and the inner side portion 1-I of the lower end of the A-pillar lower portion 1 are paired with and are in surface contact with the inner side of the joint member 7.

In one embodiment, a surface contact part between the lower end of the A-pillar lower portion 1 and the joint member 7 is coupled by a mechanical fastening member such as a screw, a Flow Drill Screw (FDS), or the like.

The A-pillar lower portion 1 is provided with a pillar rear rib 13 that protrudes rearward along a longitudinal direction of the A-pillar lower portion 1. The joint member 7 is provided with a joint upper rib 15 that is aligned with the pillar rear rib 13 of the A-pillar lower portion 1.

Therefore, the pillar rear rib 13 and the joint upper rib are configured such that the joint member 7 maintains a solid support state against a load acting on the A-pillar lower portion 1 in front and rear directions.

For reference, the A-pillar lower portion 1 is coupled to a lower side of an A-pillar and may be integrally formed with the A-pillar, unlike the disclosed embodiment. In this case, a lower end of the A-pillar may be coupled to the joint member 7.

In addition, the lower end of the A-pillar lower portion 1, the front end of the side sill 3, and the side end of the body front cross member 5 respectively refer to a lower side end portion, a front end portion, opposite side ends with respect to the vehicle.

Figure 8:
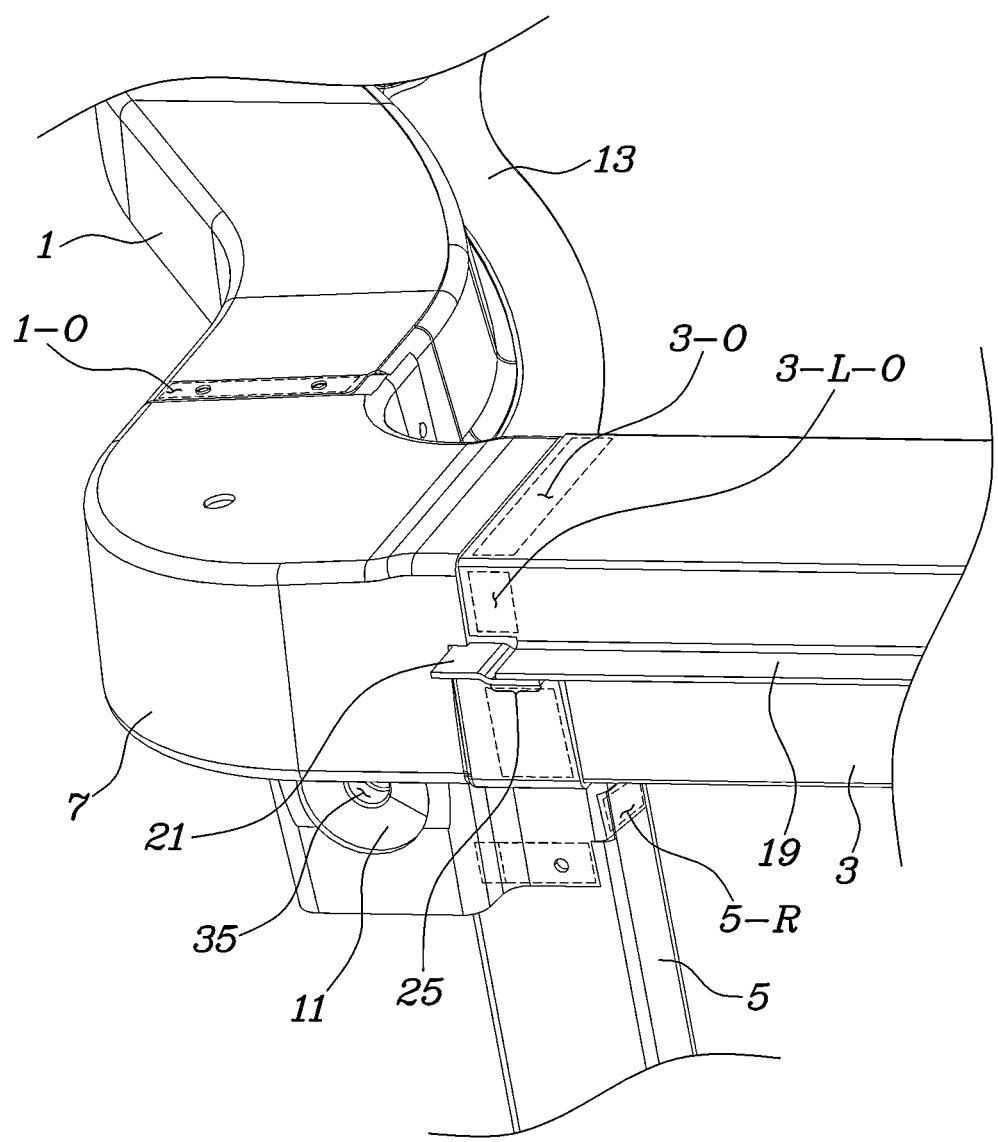
FIG. 8 is a view illustrating the components in FIG. 7 observed from a lower side of the vehicle.
Figure 9:
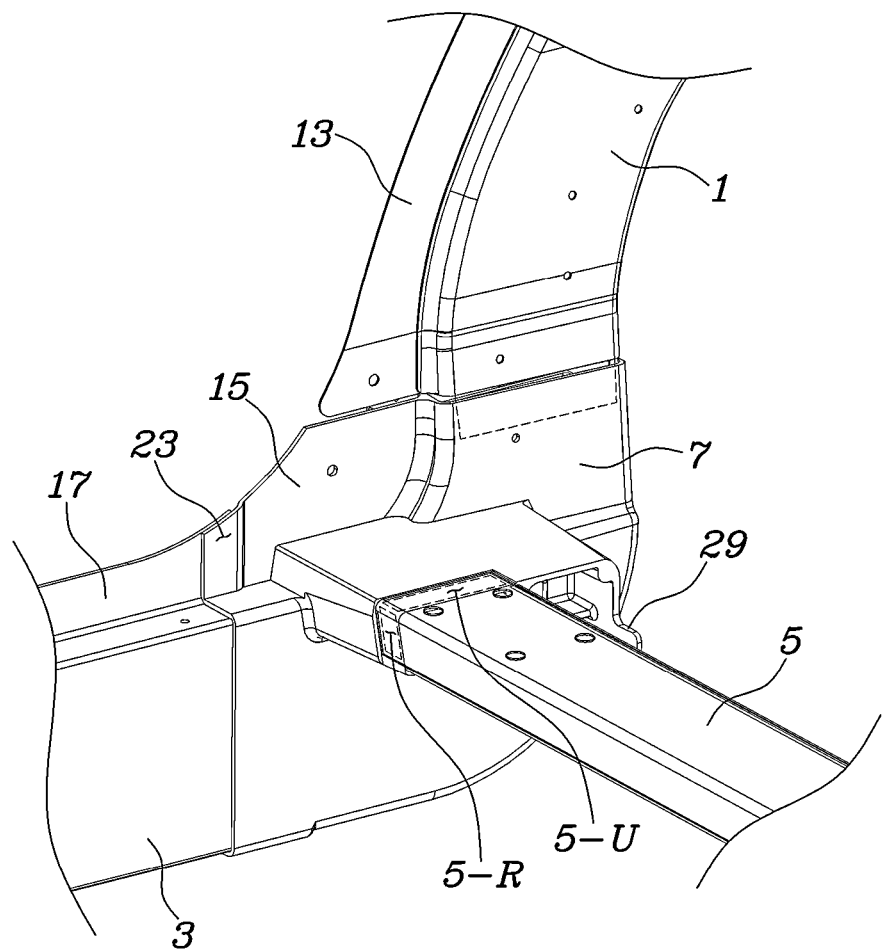
FIG. 9 is a view illustrating the components of FIG. 7 observed from an inner side of the vehicle.

Referring to FIGS. 2, 8, and 9, in the side sill 3, an outer side portion 3-O, an upper side part, and a lower side part of the front end of the side sill 3 are paired with and are in surface contact with the outer side of the joint member 7. Likewise, an inner side portion 3-I, an upper side part, and a lower side part of the front end of the side sill 3 are paired with and are in surface contact with the inner side of the joint member 7.

In other words, the side sill 3 is provided with a sill upper rib 17 and a sill lower rib 19 that respectively protrude upward and downward along a longitudinal direction of the side sill 3. Furthermore, an upper side portion 3-U of the front end of the side sill 3 is divided into an outer side portion 3-U-O and an inner side portion 3-U-I of the sill upper rib 17. The outer side portion 3-U-O of the sill upper rib 17 is in surface contact with the outer side of the joint member 7 and the inner side portion 3-U-I of the sill upper rib 17 is in surface contact with the inner side of the joint member 7.

In addition, a lower side portion 3-L of the front end of the side sill 3 is divided into an outer side portion 3-L-O and an inner side portion 3-L-I of the sill lower rib 19. The outer side portion 3-L-O of the sill lower rib 19 is in surface contact with the outer side of the joint member 7 and the inner side portion 3-L-I of the sill lower rib 19 is in surface contact with the inner side of the joint member 7.

Therefore, in the side sill 3, with respect to the sill upper rib 17 and the sill lower rib 19 of the side sill 3, an outer side has three surfaces 3-O, 3-U-O, and 3-L-O, which are paired with and which are in surface contact with the outer side of the joint member 7. Likewise, an inner side has three surfaces 3-I, 3-U-I, and 3-L-I, which are paired with and which are in surface contact with the inner side of the joint member 7. Thus, solid coupling rigidity between the side sill 3 and the joint member 7 may be secured.

In one embodiment, surface contact parts between the side sill 3 and the joint member 7 are coupled by a mechanical fastening member such as the screw, the FDS, or the like that are described above.

The joint upper rib 15, which protrudes in the front and rear directions and which is formed in a planar shape, is provided on the upper side of the joint member 7. The sill upper rib 17 is disposed such that the sill upper rib 17 is aligned on the same plane with the joint upper rib 15 in the front and rear directions.

In addition, a joint lower rib 21, which protrudes in the front and rear directions and which is formed in a planar shape, is provided on the lower side of the joint member 7. The sill lower rib 19 is disposed such that the sill lower rib 19 is aligned on the same plane with the joint lower rib 21 in the front and rear directions.

Therefore, the joint upper rib 15, the sill upper rib 17, the joint lower rib 21, and the sill lower rib 19 are configured such that the joint member 7 maintains a solid support state against a load acting on the side sill 3 in a vertical direction.

An upper offset portion 23, which has an offset modified toward a first side of the sill upper rib 17 so as to be in surface contact with the sill upper rib 17, is provided on a rear of the joint upper rib 15.

In addition, a lower offset portion 25, which has an offset modified toward a first side of the sill lower rib 19 so as to be in surface contact with the sill lower rib 19, is provided on a rear of the joint lower rib 21.

Between the upper offset portion 23 and the sill upper rib 17 and between the lower offset portion 25 and the sill lower rib 19, the mechanical fastening member such as the screw, the FDS, or the like may be fastened. Through this, a more solid coupling structure between the joint member 7 and the side sill 3 may be secured and a more solid support state of the joint member 7 against a load of the side sill 3 in the vertical direction may be realized.

Figure 10:
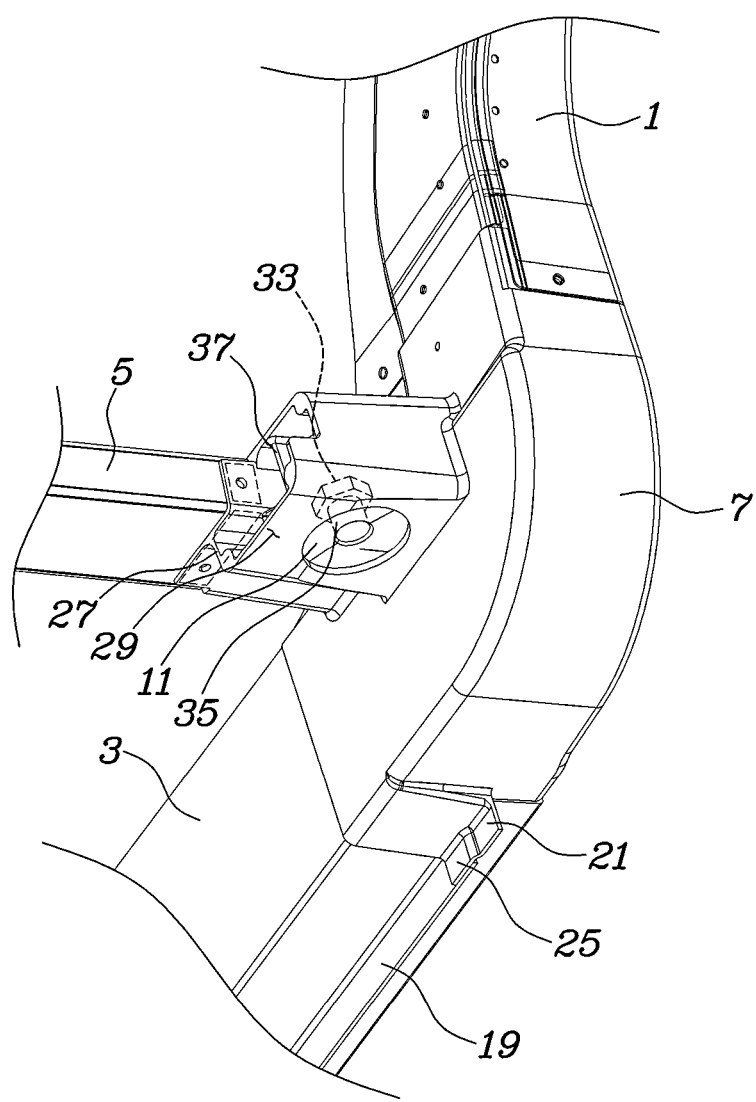
FIG. 10 is a view illustrating the components of FIG. 7 observed from a front lower side of the vehicle, the view illustrating an example in which a nut is provided as hardware.

Referring to FIGS. 9 and 10, in the body front cross member 5, an upper side portion 5-U and a rear portion 5-R of the side end of the body front cross member 5 are paired with and are in surface contact with the outer side of the joint member 7. Likewise, a lower side portion 5-L and a front portion 5-F of the side end of the body front cross member 5 are paired with and are in surface contact with the inner side of the joint member 7.

In one embodiment, portions where the side end of the body front cross member 5 is in surface contact with the joint member 7 may be coupled by a mechanical fastening member such as the screw, the FDS, or the like.

A joint side rib 27 that protrudes downward from the joint member 7 is provided on a lower side of a portion of the joint member 7. The portion of the joint member 7 is in surface contact with the lower side of the body front cross member 5.

Therefore, the joint side rib 27 is configured such that the joint member 7 maintains a solid support state against a load acting on the body front cross member 5 in the vertical direction.

In addition, in the embodiment, the joint side rib 27 is formed in a planar shape parallel to a longitudinal direction of the body front cross member 5, and a lower end of the joint side rib 27 is connected to a mounting portion surrounding wall 29 formed so as to surround the frame mounting portion 11. Thus, the body front cross member 5 may be more solidly supported.

In addition, the frame mounting portion 11 for coupling the frame 9 is integrally formed on the lower side of the joint member 7. Hardware for coupling the frame 9 is mechanically mounted on the frame mounting portion 11.

The hardware may be formed of a bolt 31 that protrudes downward from the frame mounting portion 11 or may be formed of a nut 33 that is provided on the frame mounting portion 11 such that the nut 33 is coupled to the bolt 31 that is inserted into the nut 33 from a lower side of the nut 33.

Figure 11:
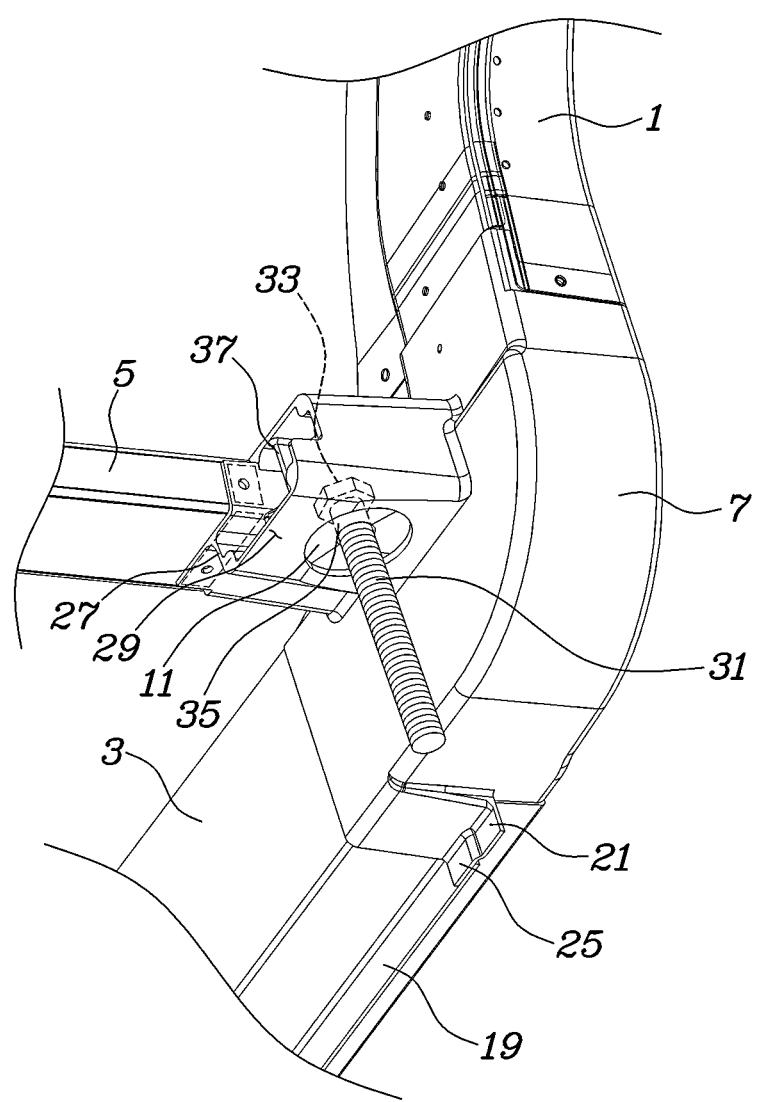
FIG. 11 is a view illustrating an example in which a bolt is provided as hardware in the configuration of FIG. 10.

For reference, FIG. 10 is a view illustrating a state in which the nut 33 is embedded in the frame mounting portion 11 of the joint member 7. FIG. 11 is a view illustrating a state in which the bolt 31 is provided in the frame mounting portion 11 of the joint member 7.

The frame mounting portion 11 may include a cylindrical portion 35 open toward the lower side of the joint member 7 and may include the mounting portion surrounding wall 29 formed so as to surround a periphery of the cylindrical portion 35. The frame mounting portion 11 may also include a plurality of mounting portion reinforcing ribs 37 formed between the cylindrical portion 35 and the mounting portion surrounding wall 29.

The mounting portion surrounding wall 29 and the mounting portion reinforcing ribs 37 are configured to secure rigidity for more solidly supporting the cylindrical portion 35 to which the hardware is coupled.

Figure 12:
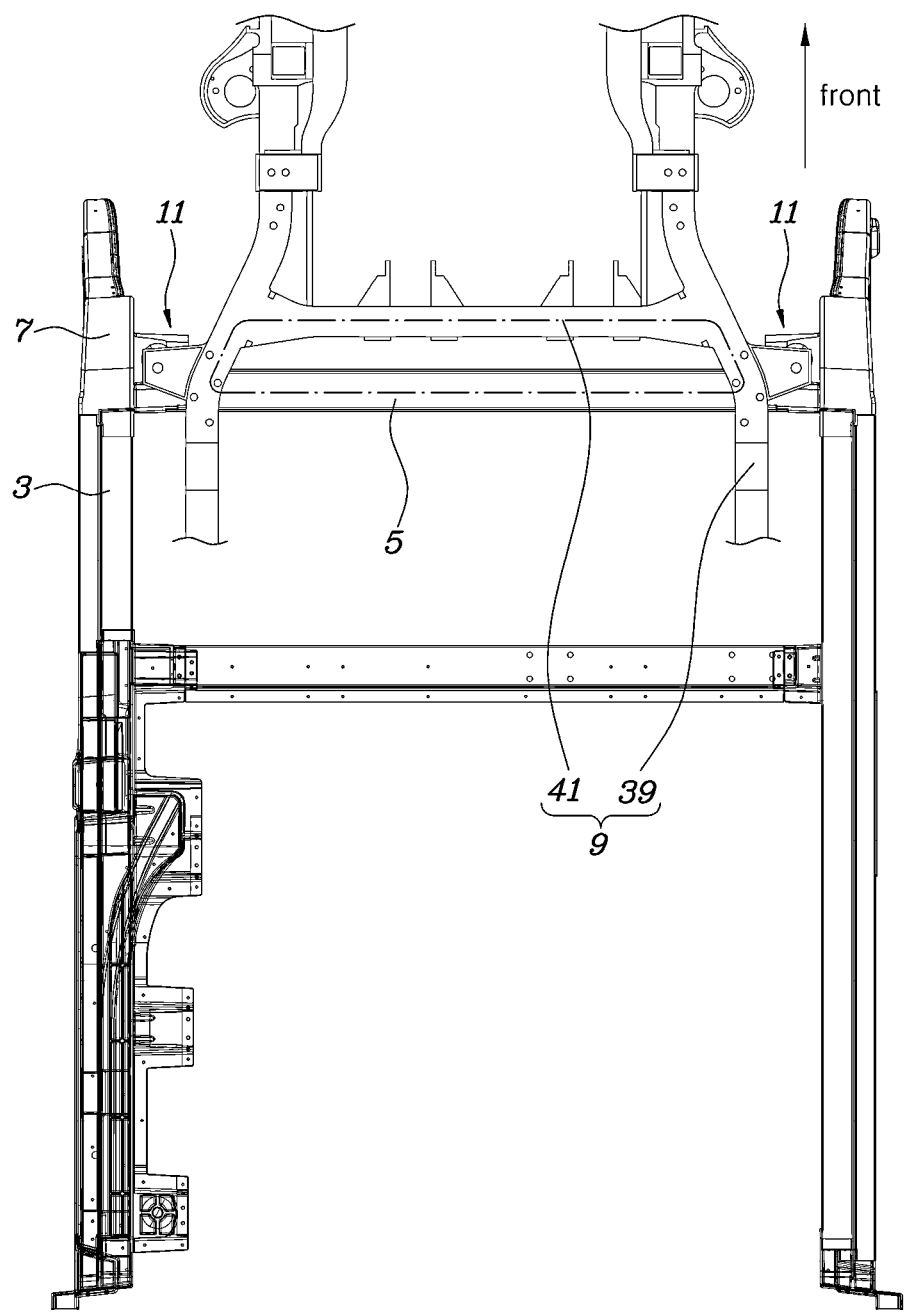
FIG. 12 is a view illustrating a state in which a frame is coupled to a lower side of a joint member observed from the lower side of the vehicle.

Referring to FIG. 12, the frame 9 coupled to the frame mounting portion 11 has a frame front cross member 41 that is provided on a front side of the vehicle so as to connect between frame side members 39 positioned at opposite sides of the frame 9. The frame front cross member 41, the frame side members 39, and the body front cross member 5 form a closed loop shape.

In other words, the frame front cross member 41 is connected to the body front cross member 5 by parts of the frame side members 39 and the joint member 7, forming the closed loop shape, as indicated by a dashed-dotted line in FIG. 12. Thus, more solid rigidity of the front of the vehicle may be secured.

Meanwhile, a seat mount 43 may be coupled to an upper side of the body front cross member 5.

For reference, a seat is mounted on an upper side of the seat mount 43.

In the embodiment, in a rear of the body front cross member 5, a body middle cross member 45 is further provided between the side sills 3 at the opposite sides of the vehicle. Also, a front of the seat mount 43 is coupled to the upper side of the body front cross member 5 and a rear of the seat mount 43 is coupled to an upper side of the body middle cross member 45.

Therefore, the seat mount 43 may form a solid lower supporting structure for supporting the seat by the body front cross member 5 and the body middle cross member 45. The seat is positioned at an upper side of the seat mount 43.

Meanwhile, the joint member 7 may be formed of light metal such as aluminum alloy or the like. The A-pillar lower portion 1, the side sill 3, and the body front cross member 5 may be formed of a steel material.

In addition, as described above, portions where the A-pillar lower portion 1, the side sill 3, and the body front cross member 5 are in surface contact with the joint member 7 may be coupled by the mechanical fastening member such as the screw, the FDS, or the like. Thus, a welding process is not required and deformation or deterioration of durability in the joint and the materials due to welding may be prevented.

Although various embodiments of the present disclosure have been described herein, it should be understood that the present disclosure is not limited to these embodiments and that various changes and modifications can be made by one of ordinary skill in the art within the spirit and scope of the present disclosure.

What is claimed is:

1. A vehicle structure comprising:
a joint member having an upper side, a rear, and a side;
an A-pillar lower portion having a closed cross-section structure and having a lower end in surface contact with and coupled to the upper side of the joint member;
a side sill having a closed cross-section structure and having a front end in surface contact with and coupled to the rear of the joint member; and
a body front cross member having a closed cross-section structure and having a side end in surface contact with and coupled to the side of the joint member,
wherein the lower end of the A-pillar lower portion, the front end of the side sill, and the side end of the body front cross member are coupled to adjacent surfaces of an outer side of the joint member with two or three surfaces thereof in surface contact with the joint member and are coupled to an inner side of the joint member with two or three surfaces thereof in surface contact with adjacent surfaces of the joint member.

2. The vehicle structure of claim 1, wherein, in the lower end of the A-pillar lower portion, a front portion and an outer side portion are in surface contact with the outer side of the joint member, and a rear portion and an inner side portion are in surface contact with the inner side of the joint member.

3. The vehicle structure of claim 2, wherein the A-pillar lower portion is provided with a pillar rear rib that protrudes rearward along a longitudinal direction of the A-pillar lower portion, and wherein the joint member is provided with a joint upper rib that is aligned with the pillar rear rib of the A-pillar lower portion.

4. The vehicle structure of claim 1, wherein, in the side sill, an outer side portion, an upper side part, and a lower side part of the front end of the side sill are in surface contact with the outer side of the joint member, and an inner side portion, an upper side part, and a lower side part of the front end of the side sill are in surface contact with the inner side of the joint member.

5. The vehicle structure of claim 4, wherein
the side sill is provided with a sill upper rib and a sill lower rib that respectively protrude upward and downward along a longitudinal direction of the side sill,
an upper side portion of the front end of the side sill is divided into an outer side portion and an inner side portion of the sill upper rib, wherein the outer side portion of the sill upper rib is in surface contact with the outer side of the joint member, and wherein the inner side portion of the sill upper rib is in surface contact with the inner side of the joint member, and
a lower side portion of the front end of the side sill is divided into an outer side portion and an inner side portion of the sill lower rib, wherein the outer side portion of the sill lower rib is in surface contact with the outer side of the joint member, and wherein the inner side portion of the sill lower rib is in surface contact with the inner side of the joint member.

6. The vehicle structure of claim 5, wherein a joint upper rib, which protrudes in front and rear directions and which has a planar shape, is provided on the upper side of the joint member, and wherein the sill upper rib is disposed such that the sill upper rib is aligned on the same plane with the joint upper rib in the front and rear directions.

7. The vehicle structure of claim 6, wherein an upper offset portion, which has an offset modified toward a first side of the sill upper rib so as to be in surface contact with the sill upper rib, is provided on a rear of the joint upper rib.

8. The vehicle structure of claim 5, wherein a joint lower rib, which protrudes in front and rear directions and which has a planar shape, is provided on a lower side of the joint member, and wherein the sill lower rib is disposed such that the sill lower rib is aligned on the same plane with the joint lower rib in the front and rear directions.

9. The vehicle structure of claim 8, wherein a lower offset portion, which has an offset modified toward a first side of the sill lower rib so as to be in surface contact with the sill lower rib, is provided on a rear of the joint lower rib.

10. The vehicle structure of claim 1, wherein, in the body front cross member, an upper side portion and a rear portion of the side end of the body front cross member are in surface contact with the outer side of the joint member, and a lower side portion and a front portion of the side end of the body front cross member are in surface contact with the inner side of the joint member.

11. The vehicle structure of claim 10, wherein a joint side rib that protrudes downward from the joint member is provided on a lower side of a portion of the joint member, the portion being in surface contact with a lower side of the body front cross member.

12. The vehicle structure of claim 11, wherein the joint side rib has a planar shape parallel to a longitudinal direction of the body front cross member, and wherein a lower end of the joint side rib is connected to a mounting portion surrounding wall formed so as to surround a frame mounting portion.

13. The vehicle structure of claim 1, wherein a frame mounting portion for coupling a frame is integrally formed on a lower side of the joint member, and wherein hardware for coupling the frame is mechanically mounted on the frame mounting portion.

14. The vehicle structure of claim 13, wherein the hardware is a bolt that protrudes downward from the frame mounting portion, or wherein the hardware portion is a nut that is provided on the frame mounting portion such that the nut is coupled to a bolt inserted into the nut from a lower side of the nut.

15. The vehicle structure of claim 13, wherein the frame mounting portion comprises:
a cylindrical portion open toward the lower side of the joint member;
a mounting portion surrounding wall formed so as to surround a periphery of the cylindrical portion; and
a plurality of mounting portion reinforcing ribs formed between the cylindrical portion and the mounting portion surrounding wall.

16. The vehicle structure of claim 13, wherein the frame coupled to the frame mounting portion has a frame front cross member that is provided on a front side of a vehicle so as to connect between frame side members positioned at opposite sides of the frame, and wherein the frame front cross member, the frame side members, and the body front cross member form a closed loop shape.

17. The vehicle structure of claim 1, wherein a seat mount is coupled to an upper side of the body front cross member.

18. The vehicle structure of claim 17, wherein, in a rear of the body front cross member, a body middle cross member is further provided between each side sill respectively positioned at opposite sides of a vehicle, and a front of the seat mount is coupled to the upper side of the body front cross member and a rear of the seat mount is coupled to an upper side of the body middle cross member.

19. The vehicle structure of claim 1, wherein the joint member is formed of a light metal, wherein the A-pillar lower portion, the side sill, and the body front cross member are formed of a steel material, and wherein portions where the A-pillar lower portion, the side sill, and the body front cross member are in surface contact with the joint member are coupled by a mechanical fastening member.

* * * * *